United States Patent
Thaler

(10) Patent No.: US 6,320,870 B1
(45) Date of Patent: Nov. 20, 2001

(54) METHOD AND APPARATUS FOR FLOW CONTROL ON A SWITCHED CSMA/CD NETWORK IMPLEMENTING BLAM

(75) Inventor: Patricia A. Thaler, Carmichael, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/139,794

(22) Filed: Aug. 25, 1998

(51) Int. Cl.[7] .......................................... H04J 3/02
(52) U.S. Cl. .................................................. 370/445
(58) Field of Search ...................... 370/401, 389, 370/352, 351, 443, 444, 445, 446, 447, 449, 451, 455, 454, 458, 461, 462, 465, 400, 395, 448

(56) References Cited

U.S. PATENT DOCUMENTS 5,537,414 * 7/1996 Takiyasu et al. .................... 370/347
6,115,390 * 9/2000 Chuah ................................. 370/348

OTHER PUBLICATIONS

Molle, A New Binary Logarithmic Arbitration Method for Ethernet, Computer Systems Research Institute, Technical Report CSRI–298, Apr. 1994.

* cited by examiner

*Primary Examiner*—Dang Ton

(57) ABSTRACT

A method and apparatus provides improved flow control on a switched CSMA/CD network where the network implements the BLAM protocol by taking advantage of the fact that a switch on the network may trigger a node to transmit immediately when buffer space becomes available. In such case, the switch then sends a packet to a port that it was previously holding off with collisions, where the packet may be self-addressed or may sent to a null address so that it is not received by any node attached to that port. Such transmission then causes a backoff to be reset to zero, and the node begins transmitting immediately. Alternatively, where a switch has been holding off several ports, it is possible to allow trigger packets from each port in turn as buffer space becomes available.

14 Claims, 4 Drawing Sheets

METHOD AND APPARATUS FOR FLOW CONTROL ON A SWITCHED CSMA/CD NETWORK IMPLEMENTING BLAM

BACKGROUND OF THE INVENTION

1. Technical Field

The invention relates to data communications networks. More particularly, the invention relates to flow control on a switched CSMA/CD network.

2. Description of the Prior Art

Data communication network protocols, such as the Ethernet protocol, are well known. While such protocols were designed during the nascent stages of data networking, the processing speed of modern hosts has increased by several orders of magnitude, to the point where the relative bandwidth of a 10 Mbps Ethernet has fallen from more than adequate to support large enterprise networks, to marginally fast enough to support a single high-performance desktop workstation. At the same time, Ethernet protocols have also evolved to incorporate new technology at the physical layer, including new media, new signaling methods, and support for higher data rates. Unfortunately, such features of Ethernet as the MAC layer protocols have remained essentially unchanged from the early days of undemanding applications running on large numbers of slow hosts.

Ethernet employs a random access MAC layer protocol. A necessary requirement for using such a protocol concerns the problem of stability, i.e. as load on the channel increases, throughput increases or remains constant. If the protocol is not stable, as load increases, wasted channel bandwidth due to collisions increases and throughput drops significantly.

It is known in the art to stabilize such protocols by employing a suitable dynamic control procedure for rescheduling packets after each collision (see for example, G. Fayolle, E. Gelenbe, and J. Labetoulle, Stability and Optimal Control of the Packet Switching Broadcasts Channel, Journal of the ACM 24(3), pp. 375–386 (July 1977). Thus, many suitable control algorithms have been discussed in the literature (see for example G. A. Cunningham, J. S. Meditch, Distributed Retransmission Controls for Slotted, Non-Persistent, and Ritual Time CSMA, IEEE Transactions on Communications, COM-36 (6), pp. 685–691, June 1988; B. Ahjek, T. van Loon, A Decentralized Dynamic Control of a Multiaccess Broadcast Channel, IEEE Transactions on Automatic Control, EC-27 (3), pp. 559–569, June 1982; and J. S. Meditch, C. A. Lea, Stability and Optimization of the CSMA and CSMA/CD Channels, IEEE Transactions on Communications, COM-31(6), pp. 763–774, June 1983).

More and more networks are using switching. In some cases, all the connections are dedicated (i.e. between a single node and a switch or between two switches) rather than shared (i.e. more than two nodes attached to the same communications media). When using a switch, a number of nodes may send traffic to the switch destined for the same output port. Also, the ports on the switch may operate at different speeds. For example, some ports may operate at 10 Mb/s and some at 100 Mb/s. Therefore, the total traffic coming into the switch destination may arrive at a faster rate than it can be transmitted out of the port. The switch typically contains storage buffers, e.g. memory, to allow it to store the excess input when this situation occurs. The switch may then wait to transmit such input later. These buffers are finite and fill when the problem situation persists over a period of time. When the buffers are full, incoming traffic must be dropped.

It is desirable to slow or stop the arrival of traffic rather than dropping the excess traffic. Several methods of flow control are either in use or under discussion to implement this. One common method in use on CSMA/CD networks is to generate a collision when a packet arrives at the switch. This may be accomplished in one of two ways:

a) The switch causes a collision whenever traffic arrives and the buffers are full; or b) The switch starts to receive the packet and examines the destination address. If the destination address indicates that the packet should go to a port with a full buffer, then the switch causes a collision.

In either case, this method has serious limitations. For example, each time a collision occurs while attempting to transmit a packet, the N node chooses a random number of slot times (e.g. 512 bit times) to delay before attempting to transmit again. The range from which the number is chosen is 0 to $2^{n-1}$ where n=min (number of transmit attempts, 10). Thus, once several collisions have occurred, the node is likely to wait for a long backoff time to expire before transmitting again. The switch may have transmitted packets and now have buffer space available, but the node does not transmit to take advantage of this for some time.

The Binary Logarithmic Arbitration Method (BLAM) is a modification of the CSMA/CD access protocol that has been proposed for and is in the process of being added to the IEEE 802.3 Standard. See for example, M. L. Molle, A New Binary Logarithmic Arbitration Method for Ethernet, Computer Systems Research Institute, University of Toronto, Technical Report CSRI-298 (April 1994). BLAM improves the fairness and delay characteristics of the CSMA/CD access protocol by basing the node backoff algorithm on all of the traffic on the network, rather than just the transmissions attempts made by the node itself. As a result, the node resets the backoff to zero when it sees a successful transmission on the network, i.e. successful transmission lasting at least 512 bits after the start of frame delimiter.

Most of the advantages of a protocol, such as BLAM, over other protocols come from deriving more information about the state of the network from the available signals coming into the host interface from the attached medium access unit (i.e. the transceiver). The primary distinction between BLAM and other protocols in terms of signaling is the use of ternary state information about the channel, i.e. idle/success/collision information. Thus, carrier sensing can be used to distinguish an idle channel from a busy channel. Furthermore, if the given host is actively transmitting, then collision detection can be used to distinguish a success from a collision, using either analog voltage levels on shared media (i.e. 10 Base 5 and 10 Base 2), or digital logic on unidirectional point-to-point channels, simultaneous, 9-loop back transmission, and reception on twisted pair or optical fiber). BLAM also demonstrates how a passive absorber can distinguish between a success or collision in which the observer was never involved. Thus, BLAM classifies such a period of activity as a collision if and only if its duration in bits, not counting the preamble and start of frame delimiter. BLAM was designed to reduce latency and increase fairness on a shared network. It does not address congestion and dropping of traffic on a bridged or switched network.

Thus, BLAM mediates backoff time by testing during the backoff for a successful transmission by another node or a collision. If a successful transmission occurs or the backoff time expires with no activity, the node will transmit. If a collision occurs, then the present backoff is abandoned and a new one is implemented. It would nonetheless be desirable for the switch to trigger the node to transmit right away when a buffer becomes available, rather than await expiration of a backoff period.

SUMMARY OF THE INVENTION

The invention provides a method and apparatus for implementing flow control on a switched CSMA/CD network where the network implements the BLAM protocol. The invention exploits to advantage the fact that it is possible for a switch on the network to trigger a node to transmit immediately when buffer space becomes available. In such case, the switch can then send a packet to the port that it was previously holding off with collisions. The packet can be a minimum size (e.g. 64 byte) packet. The packet may also be self-addressed or sent to a null address so that it is not received by any node attached to that port. Such transmission then causes the backoff to be reset to zero, and the node begins transmitting immediately. Alternatively, where a switch has been holding off several ports, the invention herein may be implemented to allow trigger packets from each port in turn as buffer space becomes available.

A first embodiment of the invention implements the technique in which the MAC relay entity communicates with the MAC entity to instruct another, overloaded MAC entity to cause a collision for every packet that it sees. In such case, there is a collision that is intentionally caused. In another embodiment of the invention, the MAC relay entity may instruct the MAC entity that a certain address or a certain destination address is having a flow problem, i.e. where there are multiple MAC entities. In such case, it is desirable to allow traffic to flow through to some of the entities but not to others. Thus, traffic may not be directed to a congested entity. In this case, the MAC entity waits to see the destination address at the beginning of the packet and, if the destination address is one that is to be blocked, then it causes a collision for that address.

Thus, when the MAC relay entity is monitoring traffic from all of the MAC entities at a switch or bridge, the MAC relay entity may become aware that some bridges or some entities have greater traffic problems or more traffic than other entities. In the case where one MAC entity has an overload, the MAC relay entity asks the MAC entity to exert or not exert flow control on the overloaded MAC entity. If the MAC relay entity instructs the MAC entity to exert flow control, then that MAC entity may either cause a collision for all packets or alternatively declare a collision only for specific packets having a destination address at which the traffic is particularly heavy or congested.

Uniquely, the technique herein disclosed provides a reset when one of these collision modes that exert flow control has been exercised. Thus, the MAC relay entity may indicate that it is no longer necessary to exert flow control. In the prior art, the backoff period would have to expire. However, in the technique described herein, the MAC entity transmits a dummy packet to clear out the backoff and reset the MAC entity that has been subjected to flow control. Thus, when the MAC relay entity sends a non-exert flow control signal, the MAC entity transmits a dummy packet to the previously overloaded MAC entity that restores the system and clears the backup.

DETAILED DESCRIPTION OF THE INVENTION

The present invention provides a method and apparatus for exerting flow control on a switched CSMA/CD network that implements the BLAM protocol. It should be appreciated that the invention is also applicable to other network protocols. The technique described herein causes a switch to trigger a node to transmit immediately when buffer space becomes available, rather than wait until the end of a backoff period. The switch can send a packet to the port that it was previously holding off with collisions. The packet can be a minimum size (64 bytes) packet. The packet may be self-addressed or sent to an old address, such that it is not received by any node attached to the port. The transmission causes the backoff to be reset to zero, and the node transmits immediately. In such cases where the switch is holding off several ports, the technique herein may be used to trigger packets from each port in turn as buffer space becomes available.

For purposes of describing the invention, the principles of operation are discussed herein in connection with the protocols set forth in IEEE Standard 802.1d. However, the invention may be applied to other protocols as appropriate.

Figure 1:
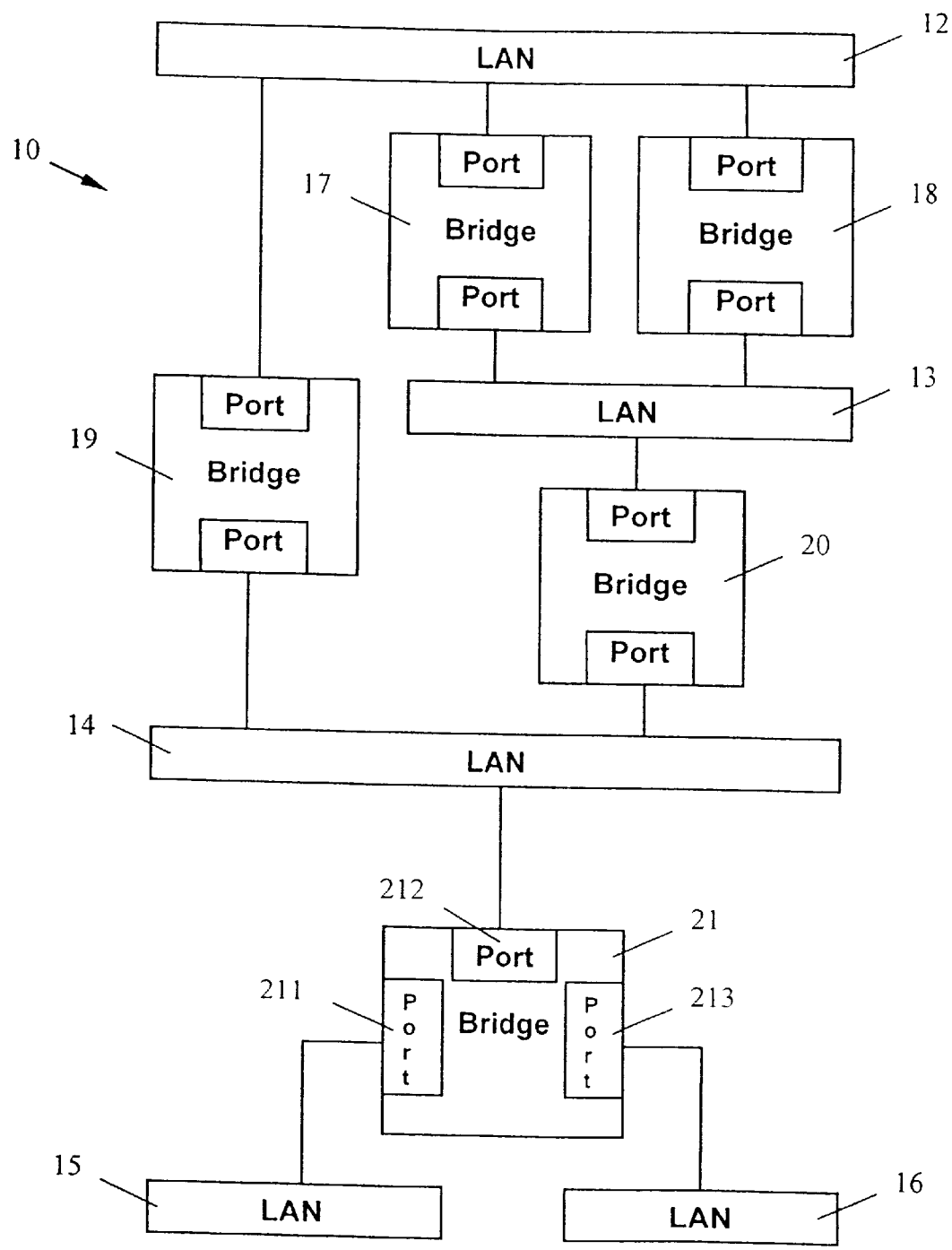
FIG. 1 is a block schematic diagram of a local area network as is known in the prior art.

FIG. 1 is a block schematic representation of a typical local area network, such as an Ethernet network. The network 10 consists of several Local Area Networks (LANs) 12–16, each of which is interconnected through a number of bridges 17–21. Each LAN is connected to one or more bridges. Connection between a LAN and a bridge is through a port. For example, ports 211, 212, 213 are shown in connection with the bridge 21. The principle functions of the bridge are to relay and filter data frames, maintain the information required to make frame filtering and relaying decisions, and management of the foregoing operations.

Figure 2:
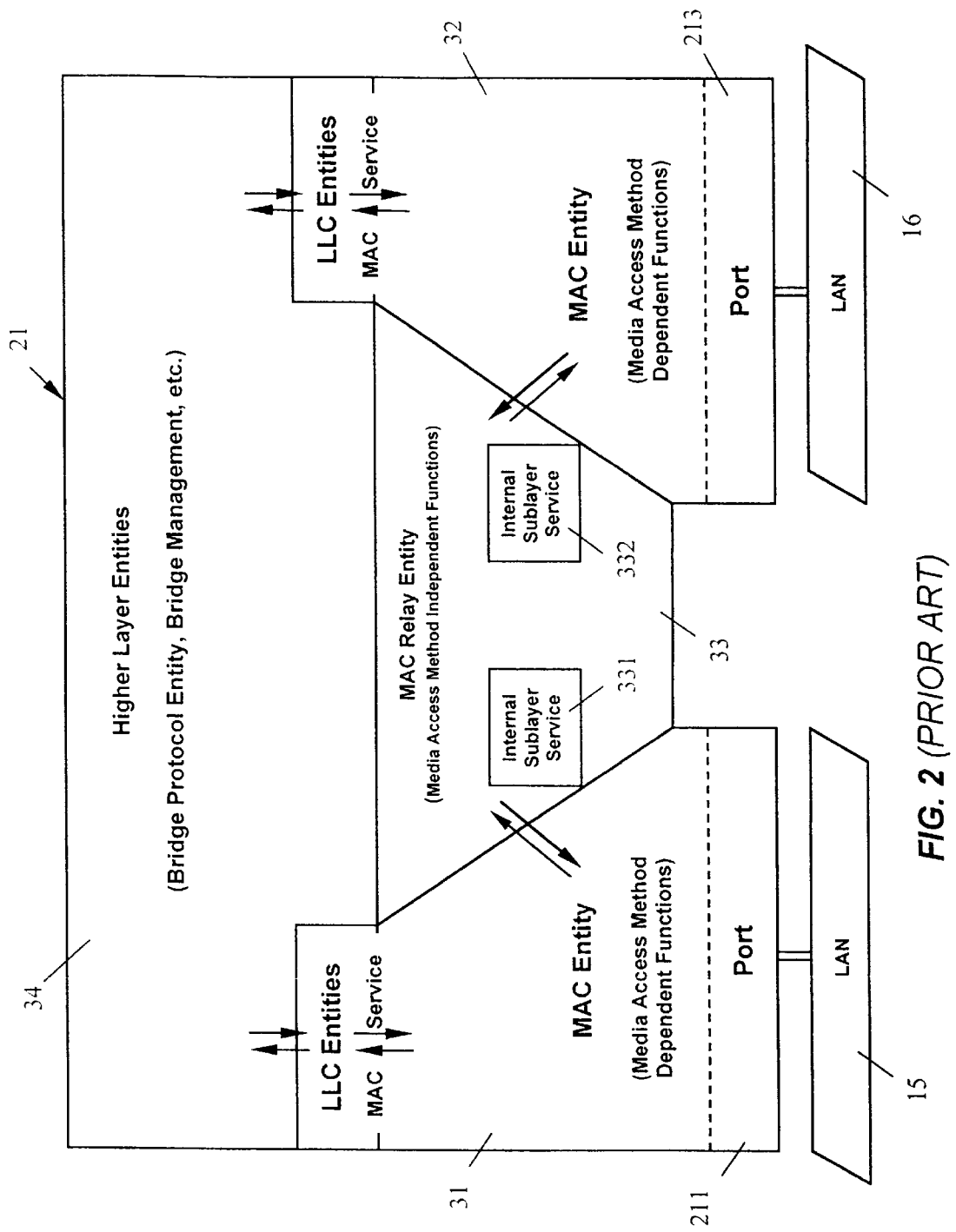
FIG. 2 is a block schematic diagram of a bridge for use in the local area network of FIG. 1.

FIG. 2 is a block schematic diagram of a bridge architecture for a MAC bridge 21 (media access control bridge). A MAC bridge relays individual MAC user data frames between the separate MACs of the bridged local area networks connecting to its ports.

A bridge filters frames to prevent the duplication of frames, i.e. it does not relay all frames received by a bridge port to other ports on that bridge. Frames transmitted between a pair of N stations can be confined to LANs that form a path between those N stations. The functions that support the use and maintenance of filtering information include permanent configuration of reserved addresses, explicit configuration of static filtering information, automatic learning of dynamic filtering information through observation of bridged local area network traffic, aging out the filtering that has been automatically learned, and calculation and configuration of bridged local area network topology.

Each bridge port (i.e. 211, 213; FIG. 2) receives and transmits frames to and from the LAN (i.e. 15, 16; FIG. 2) to which it is attached by using the services provided by the individual MAC entity 31/32 associated with the port 211, 213, respectively. The MAC entity for each port handles all the media access method dependent functions (MAC protocol and procedures) as specified in the relevant IEEE 802 Standard for that MAC technology.

Figure 3:
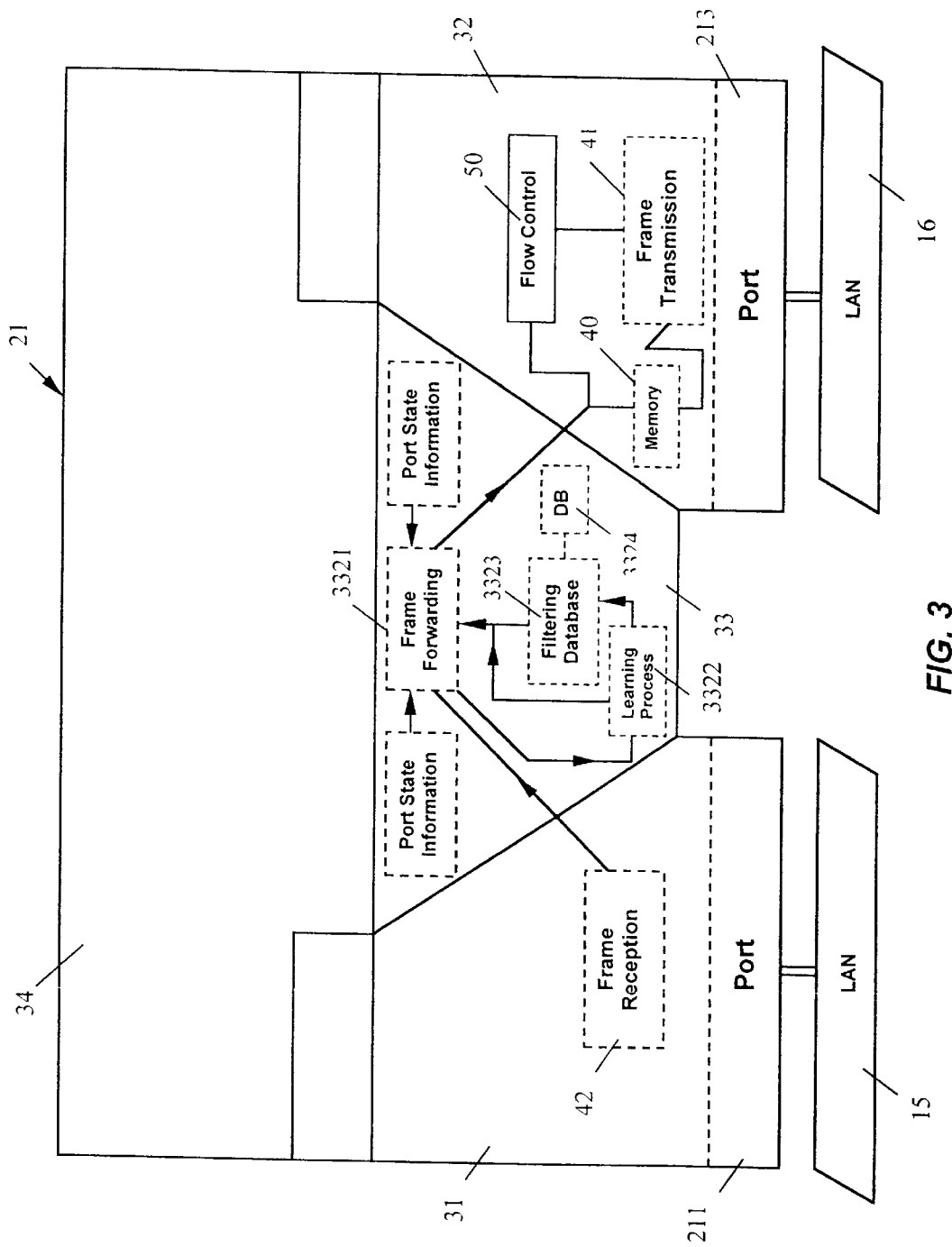
FIG. 3 is a block schematic diagram showing an Ethernet bridge.

The MAC relay entity 33 handles the media access method independent functions of relaying frames between bridge ports, filtering frames and learning filtering information. The higher layer entities 34, such as bridge protocol entity, handle calculation and configuration of bridged local area network topography. The MAC relay entity 33 uses the internal sublayer service provided by the separate MAC entities for each port. The bridge protocol entity and other higher layer protocol users, such as bridge management, make use of logical link control procedures. These procedures are provided severally for each port and use the MAC service provided by the individual MAC entities. While FIG. 2 illustrates a bridge and its ports and the architecture of the bridge for a bridge with two ports, it should be appreciated that a bridge may have more than two ports. FIG. 3 is a block schematic diagram showing the MAC relay entity of an Ethernet bridge in greater detail.

The MAC relay entity 33 uses internal sublayer services 331, 332 provided by the two or more individual MAC entities associated with each bridge port. Frames are accepted for transmission and delivered on reception to and from processes and entities that model the operation of the MAC relay entity and a bridge. These are:

a) The forwarding process 3321 which forwards received frames that are to be relayed to the other bridge ports, while filtering frames on the basis of information contained in the filtering database and on the state of bridge ports. Forwarded frames are stored in a memory 40 associated with a frame transmission process 41 in a transmitting MAC entity 32, while frames are provided to the MAC relay entity from a receiving process 42 in a receiving MAC entity 31.

b) The learning process 3322 which, by observing the source addresses of frames received on each port, updates the filtering database unconditionally on the state of the port on which frames are observed.

c) The filtering database 3323 which holds filtering information either explicitly configured by management action or automatically entered by the learning process, and which supports queries by the forwarding process as to whether frames with given values of the destination MAC address field should be forwarded to a given port.

Each bridge port also functions as an end station, providing the MAC service to the Logical Line Control (LLC) which supports:

a) The bridge protocol entity which operates a MAC sublayer configuration protocol between bridges and, which determines in part the state of each bridge port and its participation in the active topology of the bridge local area network, and b) Other users of LLC, such as protocols providing bridge management.

Each bridge port supports the operation of LLC procedures and, thereby, the operation of the bridge protocol entity. Bridge ports may support other types of LLC procedures which may be used by other protocols.

State information associated with each bridge port governs its participation in the bridge local area network. If management permits a port to participate in frame relay and if it is capable of doing so, then the port is described as active. The IEEE 802.1D Standard specifies the use of a spanning tree algorithm and protocol which simplifies the topology of the bridge local area network required to connect an active topology. Ports that continue to participate in frame relay are described as being in a forwarding state.

The incorporation of end station location information and filtering database information by the learned process also depends on the active topology. If information associated with frames received on a port is to be incorporated in the filtering database by the learned process, then the port is described as being in a learning state. Otherwise, it is in a non-learning state.

The individual MAC entity associated with each bridge port examines all frames transmitted on the LAN to which it is attached. Frames that are in error, as defined by the relevant media access method, are discarded. All other frames are submitted to the learning process.

Frames relayed to the bridge port from other bridge ports in the same bridge and addressed to that bridge port as an end station are also submitted to the LLC. The individual MAC entity associated with each bridge port transmits frames submitted to it by the MAC relay entity. Relayed frames are submitted for transmission by the forwarding process 3321.

LLC protocol data units are submitted by the LLC as a user of the MAC service by the bridge port. Frames transmitted to convey such protocol data units carry the individual MAC address of the port and the source address field. Each frame is transmitted subject to the MAC procedures to be observed for that specific LAN technology. Frames transmitted following a request by the LLC user of the MAC service provided by the bridge port are also submitted to the MAC relay entity.

The frame forwarding process forwards received frames that are to be relayed to other bridge ports, while filtering frames on the basis of information contained in the filtering database and on the state of the bridge ports. A frame received on a bridge port and submitted to the forwarding process is queued for transmission on each of the other bridge ports if and only if:

a) The port on which the frame was received was in a forwarding state;

b) The port on which the frame is to be transmitted is in a forwarding state; and c) Either:
   (i) The filtering database indicates that frames with this value of the destination MAC address field should be forwarded through the transmission port as would happen, for example, if the destination address was not in the database; or
   (ii) The values of the source and destination MAC address fields are the same and the bridge is configured not to filter such frames; and d) The maximum service data unit size supported by the LAN to which the transmission port is attached would not be exceeded.

A bridge may either filter frames whose source and destination MAC address fields have the same value to localized traffic, or it may forward such frames to support an optional LLC duplicate address check function. The forwarding process provides storage for queued frames, awaiting an opportunity to submit these for transmission to the individual MAC entities associated with each bridge port. The order of queued frames is maintained. A frame queued by the forwarding process for transmission on a port is removed from that queue on submission to the individual MAC entity for that port and no further attempt is made to transmit the frame on the port even if the transmission is known to have failed.

A frame queued by the forwarding process for transmission on the port can be removed from that queue and not subsequently transmitted if the time for which buffering is guaranteed has been exceeded for that frame. A frame queued for transmission on a port is removed from that queue and not subsequently submitted to the individual MAC entity for that port if it is necessary to ensure that a maximum bridge transmit delay is not exceeded at the time at which the frame is subsequently transmitted. A frame queued for transmission on a port is removed from that queue if the associated port leaves the forwarding state. Removal of a frame from a queue for transmission on any particular port does not, of itself, apply that it shall be removed from a queue for transmission on any other port.

Outbound user priority and outbound access priority parameters may be set by management. If this capability is provided, the value of the parameters are independently set for each transmission port, and the bridge then has the capability to use the full range of values in the parameter ranges. If this capability is not provided, the bridge uses default values.

The learning process observes the source addresses of frames received on each port and updates the filtering database conditionally on the state of the receiving port. Frames are submitted to the learning process by the individual MAC entities associated with each bridge port as specified. The Learning Process may deduce the path through a bridged local area network to particular end stations by inspection of the source address field of received frames. The learning process can create or update a dynamic entry in the filtering database, associating the port on which the frame was received with the MAC address in the source address field of the frame, if and only if:

1) The port on which the frame was received is in a state that allows learning;
2) The source address field of the frame denotes a specific end station, i.e. is not a group address;
3) A static entry for the associated MAC address does not already exist; and
4) The resulting number of entries would not exceed the capacity of the filtering database.

If the filtering database is already filled up to its capacity, but a new entry would otherwise be made, then an existing entry may be removed to make room for the new entry. The filtering database holds filtering information that is either explicitly configured by management action or automatically entered by the learning process. It supports queries by the forwarding process as to whether frames with given values of the destination MAC address field should be forwarded to a given port.

The filtering database contains static entries. It is also capable of containing dynamic entries. Both types of entry cannot exist for a given MAC address. Thus, a dynamic entry cannot be created if a static entry for the same MAC address already exists, and creation of a static entry causes the removal of a dynamic entry for the same address if one exists.

The filtering database may be interrogated and updated by management. Such management may be carried out by local or private means, or by use of the remote management capability. Static entries may be added to and removed from the filtering database under explicit management control. They are not automatically removed by any time-out mechanism.

Static entries specify:
1) The MAC address for which filtering is specified; and
2) For each inbound port on which frames are received, a port map that specifies for each outbound port on which frames may be transmitted, whether frames shall be filtered or forwarded to that port.

The MAC addresses that can be specified include group addresses and the broadcast address.

Dynamic entries are created and updated by the learning process, and are automatically removed if a specified time has elapsed since the entry was created or last updated. This timing out of entries ensures that end stations that have been moved to a different part of the bridged local area network are not permanently prevented from receiving frames. It also takes account of changes in the active topology of the bridged local area network which can cause end stations to appear to move from the point of view of a bridge; i.e. the path to those end stations subsequently lies through a different bridge port.

The time-out value, or aging time, after which a dynamic entry is automatically removed, may be set by management. If the value of aging time is set by management, the bridge then has the capability to use values in the range specified, with a typical granularity of 1 second.

A spanning tree algorithm and protocol is provided that includes a procedure for notifying all bridges in the bridged local area network of topology changes and that specifies a short value for the time-out value which is enforced for a period after any topology change. This procedure allows the normal time-out, operable during periods in which the topology does not change, to be long enough to cope with periods for which addressed end stations do not generate frames themselves, e.g. by being powered down, while not sacrificing the ability of the bridged local area network to continue to provide a service after automatic reconfiguration.

Dynamic entries specify:
1) The MAC address for which filtering is specified; and
2) A port number.

Frames with the specified destination MAC address are forwarded only to the specified port. A dynamic entry acts as a static entry with a single port selected in the port map. The MAC addresses specified in dynamic entries do not include group addresses and the broadcast address.

The filtering database contains a permanent database 3324 (FIG. 3) which provides fixed storage for static entries. The filtering database is initialized with the static entries contained in this fixed data store. Static entries may be added to and removed from the Permanent Database under explicit management control.

The bridge protocol entity operates the spanning tree algorithm and protocol, disclosed above (see, also FIG. 2).

The bridge protocol entities of bridges attached, through their ports, to the same individual LANs in a bridged local area network, communicate by exchanging bridge protocol data units (BPDUs).

Bridge management protocols use the service provided by the operation of LLC procedures, which use the MAC service provided by the bridged local area network.

The specific MAC address used by every MAC entity communicating across the bridged local area network is unique in that network, and therefore specifies the addressed station unambiguously.

Frames transmitted between end stations using the MAC service provided by a bridged local area network carry the MAC address of the source and destination peer end stations in the source and destination address fields of the frames, respectively. The address, or other means of identification, of a bridge is not carried in frames transmitted between peer users for the purpose of frame relay in the bridged local area network. The broadcast address and other group addresses apply to the use of the MAC service provided by the bridged local area network as a whole. Frames with such values of the destination address field are, in the absence of explicit management configuration of the filtering database, relayed throughout the bridged local area network.

The individual MAC entity associated with each bridge port has a separate specific MAC address. This address is used by the MAC procedures operated by the MAC entity, if required by the particular media access method employed.

Frames that are received from the LAN to which a port is attached and which carry a MAC address for the port in the destination address field are submitted to the MAC service user (LLC) exactly as for an end station. Bridge protocol entities only receive and transmit BPDUs. These are only received and transmitted from other bridge protocol entities (or in circumstances where two bridge ports are connected to the same LAN, to and from themselves).

Bridge management entities transmit and receive protocol data units using the service provided by the individual LLC entities associated with each bridge port. Each of these in turn uses the MAC service, which is provided by the individual MAC entities associated with that port and supported by the bridged local area network as a whole. As a user of the MAC service provided by a bridged local area network, the bridge management entity may be attached to any point in the bridged local area network. Frames addressed to the bridge management entity are relayed by other bridges if necessary to reach the LAN to which it is attached. To ensure that received frames are not duplicated, the basic requirement in a single LAN or a Bridged local area network that a unique address be associated with each point of attachment must be met.

A bridge management entity for a specific bridge is addressed by one or more specific MAC addresses in conjunction with the higher layer protocol identifier and addressing information. It may share one or more points of attachment to the bridged local area network with the ports of the bridge with which it is associated. It is necessary for the operation of the bridge protocol that a single unique identifier be associated with each Bridge. This identifier is derived from a unique MAC address for the bridge, known as the bridge address. The unique bridge identifier used by the spanning tree algorithm and protocol is derived from the bridge address.

Implicit in the frame forwarding process is a method of frame arbitration. For CSMAICD LANs, this arbitration includes provision of a backoff algorithm that mediates network traffic during periods of network congestion. As discussed above, the binary logarithmic arbitration method (BLAM) provides a CSMA/CD access protocol that bases a node backoff algorithm on all of the traffic on the network, and that resets the backoff to zero when a successful transmission is observed. The following is a state machine based description of the transmit process in each host under BLAM (Source: M. L. Molle, A New Binary Logarithmic Arbitration Method for Ethemet, Computer Systems Research Institute, University of Toronto, Technical Report CSRI-298, April 1994):

Definition of Variables and Constants slotTime standard Ethernet constant, equal to 512 bit times interFrameGap standard Ethernet constant, equal to 96 bit times attemptLimit standard Ethernet constant; recommend increasing from 16 to 20

CCounter the BLAM collision counter variable; replaces standard Ethernet variable attempts.

Back BLAM variable containing the most recently generated backoff delay according to the standard Ethernet rule, i.e., a discrete uniform integer multiple of the slotTime over the range $0.2^{min}(CCounter, 10)-1$.

BurstStart BLAM variable, used to mark the start of the channel holding time interval for the successful host.

BurstLength BLAM constant, holds the maximum time after BurstStart at which the successful host can begin another packet transmission without returning to the arbitration phase.

BurstSpace BLAM constant, equal to 192 bit times (i.e., twice interFrameGap).

Maxidle BLAM constant, equal to 1024 bit times (i.e., twice slotTime). It is used to control a time-out for decrementing CCounter on the basis of no activity on the channel.

Current Time the current time. (Any counter running at the channel bit rate will do, since we only care about time differences, rather than absolutes.)

Initialization Phase—Newly active Host Joins the Algorithm

1. Start: This is the initial state, where a host begins the algorithm by generating its first packet after some period of inactivity. Because of limited sensing, it is assumed that the host does not know the global state of the algorithm, and initializes the BLAM channel holding timer BurstStart to an undefined value, and CCounter to its initial value of 1.

Wait for end-of-carrier (if necessary), then proceed to state doBackoff if no carrier is present or if it is the end of a successful transmission. Note that this means BLAM uses a delayed (instead of immediate) transmission rule for the first attempt. Note, also, that it is possible to assume either that some other host is in the midst of a transmission burst, or that a new arbitration period is about to begin. For compatibility with regular Ethernet hosts, the latter is selected, which forces all hosts to begin a new arbitration period. Otherwise, the end of a collision has occurred, in which case an arbitration period must be in progress (for which the correct value of CCounter is not known), and flow proceeds to state SawCollision.

Arbitration Phase—All Active Hosts are Attempting to Acquire the Channel 2. doBackoff All active hosts are ready to select a new backoff delay following an update to C Counter. The BLAM channel holding timer BurstStart should be undefined, and there should be no carrier present, except, for backwards compatibility with standard Ethernet, BLAM allows hosts involved in a collision to begin their backoff interval at the end of their own jam signal instead of waiting for end-of-carrier.

Calculate a new backoff delay, Back, using a standard truncated binary exponential distribution, then proceed as follows:

If Back=0, then proceed to state Deferring because this host is now committed to a transmission attempt as soon as the interFrameGap has elapsed.

Otherwise, if Back≦Maxidle, then set a time-out for CurrentTime+Back and wait for the next event, which may be:

(i) start-of-carrier, in which case, go to state OtherBusy, or (ii) time-out expired, in which case go to state Deferring.

Finally, if Back>Maxidle, then set a time-out for CurrentTime+Maxidle and wait for the next event, which may be:

(i) start-of-carrier, in which case, go to state OtherBusy, or (ii) time-out expired, in which case, go to state TooQuiet.

3. TooQuiet: Assume that an idle period longer than Maxidle means that the estimated value of Q is too large. Reset CCounter to max (CCounter-1, 1) and return to state doBackoff Note: A more complex state machine with slightly better randomizing properties would update the backoff interval after a change in CCounter via Back=floorBack/2)–slotTime, where the floor and division can both be done using a shift, instead of recreating it from scratch in state doBackoff. This change has the advantage of ensuring that any host that chose Back=Maxidle would not have to change its scheduled transmission time.

4. Deferring: The host is now committed to a transmission attempt. Follow the standard Ethernet deference rule to ensure a proper interFrameGap and proceed to state Xmit.

5. Xmit: The host begins transmitting a packet. Assign BurstStart=CurrentTime, in case this turns out to be a success and wait for the next event. If a collision is detected, proceed to state XAbort. Otherwise, proceed to state XDone when the transmission is finished.

6. XAbort: The host detected a collision during its transmission attempt. Assign BurstStart=undefined, CCounter=CCounter+1, and wait until the complete preamble has been transmitted (if necessary). Start transmitting a JAM pattern and proceed to state JDone.

7. JDone: If CCounter=attemptLimit, then report an excessiveCollision Error and assign CCounter=1. Wait for transmission of the JAM pattern to finish and proceed to state doBackoff.

8. OtherBusy. One (or more) other hosts transmitted before the subject host did. Assign BurstStart=CurrentTime in case it turns out to be a successful transmission, and wait for end-of-carrier.

If a collision has just occurred, then the arbitration phase is continuing, so proceed to state SawCollision. Otherwise, the other host has acquired the network and we proceed to state SawSuccess.

9. SawCollision: A collision involving other hosts has just occurred. Assign BurstStart=undefined, because no host has managed to acquire the channel. Also, because all updates to CCounter are symmetric under BLAM, assign CCounter=CCounter+1 even though the host did not participate in the collision. If CCounter=attemptLimit, then report an excessiveCollisionError and assign CCounter=1. Proceed to state doBackoff.

Another Host has Acquired the Network for a Transmission Burst

10. SawSuccess: The end of a successful transmission by some other host has just occurred. All active hosts should reset their local copy of CCounter to 1 in preparation for the eventual start of the next arbitration period. In the meantime, the subject host must decide whether or not to concede control of the network to the successful host.

If currentTime—BurstStart<BurstLength—interFrameGap, then under BLAM the successful host must be permitted to send another packet without interference. In that case, set a time-out for CurrentTime+BurstSpace and wait for the next event, which may be:
    (i) start-of-carrier, in which case, proceed to state MoreBusy; or
    (ii) time-out expired, in which case, proceed to state OtherDone.

Otherwise, the channel holding time condition must have failed: assign BurstStart=undefined and proceed to state doBackoff.

11. OtherDone: The successful host ran out of packets before its channel holding timer expired. Assign BurstStart=undefined and proceed to state doBackoff.

12. MoreBusy. The successful host is continuing to send packets in a burst. Wait until end-of-carrier.

If another successful transmission (the normal case) has just occurred, then proceed to state SawSuccess. Otherwise, a collision has just occurred. Proceed to state SawCollision. Collisions are caused by hosts that are either newly active, and do not know the state of the algorithm, or are using the standard Ethernet algorithm, and do not obey BLAM.

The Subject Host has Acquired the Network for a Transmission Burst

13. XDone: The subject host has completed a successful packet transmission. Thus, it is entitled to continue its current burst until its burst length timer runs out, if it can begin transmitting another packet before the other hosts time out and enter state OtherDone.

More precisely, if:
    (i) The subject host cannot begin its next packet transmission before the channel holding timer expires, i.e. $currentTime - BurstStart \geq BurstLength - \max\{interFrameGap, Host\ Reset\ Time\}$;
    (ii) The interpacket spacing is too large to prevent the other hosts from triggering its inactivity timer, i.e. $BurstSpace - Host\ Reset\ Time \leq interFrameGap/2$; or
    (iii) The host's transmit queue is empty, then its transmission burst is over:

assign BurstStart=undefined and proceed to state Start

Otherwise, the subject host can continue its transmission burst:
    wait for the host interface to be reset (if necessary) and proceed to state XMore, if start-of-carrier is not detected in the mean time, or to state XRobbed, otherwise.

14. XMore: The subject host expects to transmit another packet without interference from any other host (except for newly active hosts, and those using the standard Ethernet algorithm). Follow the standard Ethernet deference rule to ensure a proper interFrameGap, then start transmitting the next packet, and wait for the next event. If a collision is detected, proceed to state XAbort. Otherwise, proceed to state XDone when the transmission is finished.

15. XRobbed: This host had its transmission burst cut short by a collision.

Assign BurstStart=undefined, and proceed to state Start.

The invention incorporates a reset function to provide an enhanced functionality in the foregoing network protocol. As discussed above, where an idle period longer than a Maxidle has occurred, a counter is reset. In this way, BLAM uses a timer or counter time-out to reset a backoff period in the event there is little or no activity on a particular channel. However, the invention also reduces the delay from an undesirable maximum of 32–40 slot times (i.e. the BLAM algorithm could take 16–20 durations of Maxidle before transmitting when the link is idle) to a single slot time (i.e. the time necessary to transmit the dummy packet); provides for multiple MAC entities where the combination of traffic from several input MAC entities is directed to a single output MAC entity; and where the LAN to which the MAC entity is attached has significant traffic from other LANs.

Figure 4:
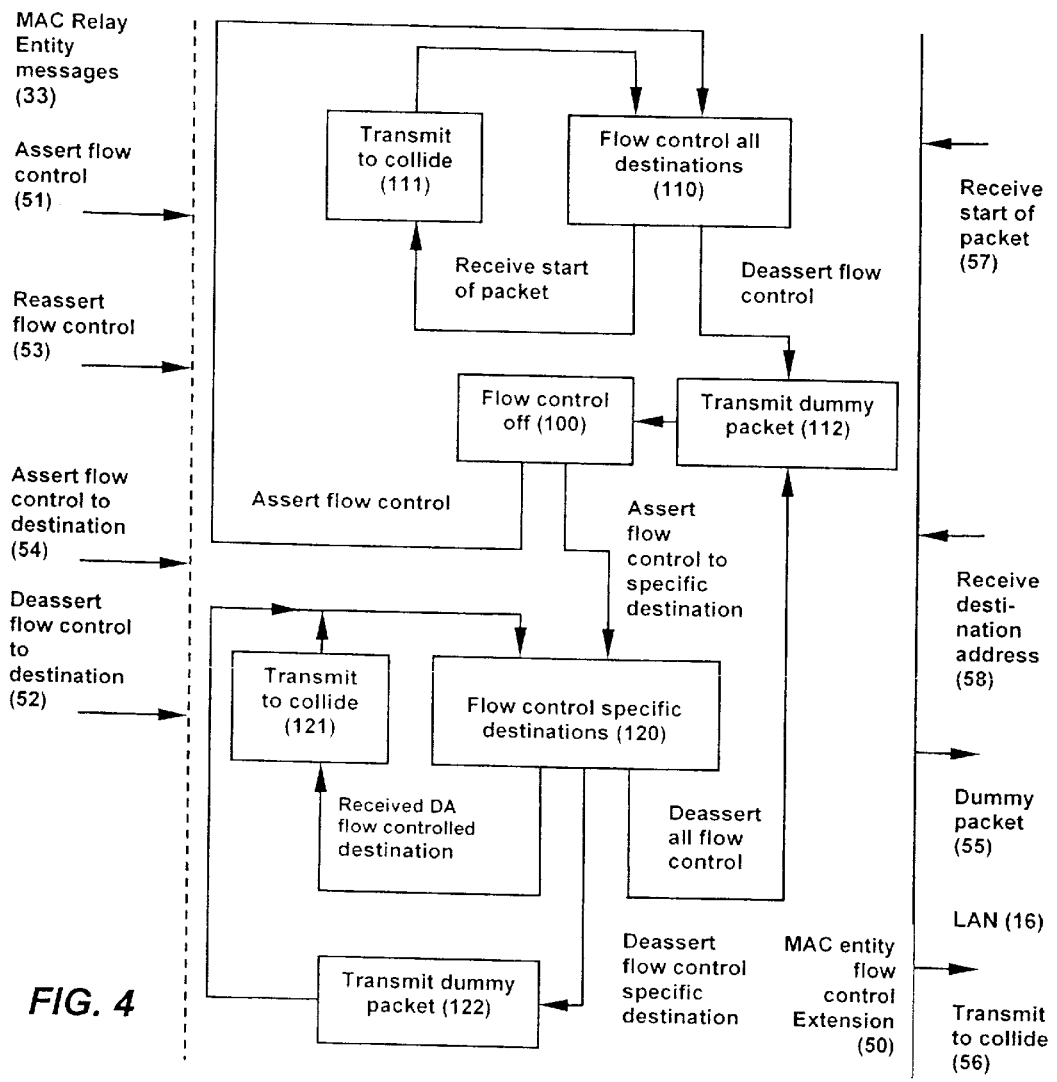
FIG. 4 is a flow diagram of a method for implementing flow control in accordance with the invention.

FIG. 4 is a flow diagram of a method for implementing flow counter in accordance with the invention. The invention provides for the transmission of a dummy packet or a null packet in accordance with a unique flow control mechanism 50 associated with the MAC entity 32 (FIG. 3) in the exemplary embodiment of the invention. However, the flow control mechanism can also be associated with the MAC relay entity 33 in other embodiments of the invention. Such a dummy packet may generate a collision for all packets at overloaded, remote MAC entities or a collision only for a destination address. Thus, the MAC relay entity may instruct the MAC entity to assert flow control 51, deassert flow control at a specific destination 52, reassert flow control 53, or assert flow control to a specific destination 54. Accordingly, if there is significant traffic for a remote MAC entity, then flow control is exerted in accordance with standard procedures. However, if the MAC relay entity determines that the level of traffic is not sufficient to exert flow control and the MAC entity still is exerting flow control, then the MAC relay entity may instruct the MAC entity not to exert flow control. In such case, the MAC entity transmits a dummy packet 55. This resets the remote MAC entity and clears the backoff.

Thus, the invention makes it possible for the switch to trigger the node to transmit immediately when a buffer becomes available at the remote MAC entity. In one preferred embodiment of the invention, the switch can send a packet to the port that it was previously holding off with collisions 56. The packet may be a minimum size (64 byte) packet. Additionally, the packet may be self-addressed or sent to a null address so that it is not received by any node attached to the port. Such transmission causes the backoff to be reset to zero and the node then begins transmitting immediately. In such cases where the switch has been holding off several ports, the method and apparatus described herein may be used to allow trigger packets from each port in turn as buffer space becomes available.

With reference to FIG. 4, one embodiment of the invention monitors traffic at the bridge with the MAC relay entity 33. Under predefined traffic conditions, a determination is made at the MAC relay entity to assert flow control 51. If flow control is not asserted, the destination ports continue to transmit traffic to the network. If flow control is asserted, a determination is made whether a backoff should be set for all destinations 51, or only for those destinations that are considered particularly congested 54. If all destinations are subjected to flow control, then a backoff period is set at the remote MAC entity. If only specific destinations are to be subjected to flow control, then a backoff period is set for only those destinations, and traffic for all other destinations is transmitted.

The MAC entity flow control extension 50 has three major states. At any given time, it is either exerting flow control to all destinations, flow control the specific destinations, or non-flow control to other destinations:

With flow control off 100, the system is not transmitting any extra packages. This state has two exits, one to assert flow control to all destinations 110, and the other to assert flow control but only to one or more specific destinations 120.

When the system asserts flow control to all destinations, one of two things can happen:

When a port is starting to transmit 57, the system causes a collision 111, i.e. it starts transmitting 56, and the remote port backs off.

When a port is told to deassert flow control 51, the system transmit 112 a dummy packet 55 that causes the MAC entity at the other end to reset its backoff counter back down to zero.

The other possibility is that the system asserts flow control to specific destinations 120, and then waits to receive not just the start of a packet 57, but also to receive the destination address 58 in the packet. The system then checks to determine if the destination address equals a flow control destination. If so, the system transmits 121 to collide 56. If the system is to deassert flow control at a specific destination, then the system transmits 122 a dummy packet 55 to that destination. Thus, that destination is freed to go ahead and try to transmit again.

Although the invention is described herein with reference to the preferred embodiment, one skilled in the a art will readily appreciate that other applications may be substituted for those set forth herein without departing from the spirit and scope of the present invention. Accordingly, the invention should only be limited by the Claims included below.

What is claimed is:

1. A method for providing improved flow control on a switched network having LANs implementing a CSMA/CD protocol, wherein said CSMA/CD protocol in use resets a backoff period of a network node based on observation of a successful transmission of a packet, wherein said packet is either self-addressed or addressed to a null address such that said packet is not received by any node attached to a port, the method comprising the steps of:

holding off other nodes from transmitting, while asserting flow control, by watching for reception of a start of said packet;

transmitting, upon reception of said start of said packet, to cause a collision upon assertion of flow control; and causing of other nodes to resume attempts to transmit by transmitting said packet to deassert flow control.

2. The method of claim 1, wherein the network implements a Binary Logarithmic Arbitration Method.

3. The method of claim 1, wherein a switch has been holding off several ports, further comprising the step of:

allowing trigger packets from each port in turn as buffer space becomes available.

4. The method of claim 1, wherein said switched network is a CSMA/CD network.

5. An apparatus for providing improved flow control over a node on a switched network by transmitting a packet which is either self-addressed or addressed to a null address such that said packet is not received by any node attached to a port, comprising:

means for triggering a node to transmit immediately when buffer space becomes available;

means for transmitting said packet to said port that is in the midst of a backoff period; and means for causing said backoff period to be reset zero upon reception of said packet;

wherein said node begins transmitting immediately.

6. The apparatus of claim 5, wherein the network implements a Binary Logarithmic Arbitration Method.

7. The apparatus of claim 5, wherein a switch has been holding off several ports, further comprising:

means for allowing trigger packets from each port in turn as buffer space becomes available.

8. The apparatus of claim 5, wherein said switched network is a CSMA/CD network.

9. A method for providing improved flow control on a CSMA/CD network including at least one switch having a MAC relay entity and a plurality of remote MAC entities, comprising the steps of:

monitoring traffic from all of said remote MAC entities at a switch or bridge with said MAC relay entity;

notifying said MAC relay entity that one or more of said remote MAC entities have excess traffic;

instructing a local MAC entity with said MAC relay entity to exert or not exert flow control at one or more of said remote MAC entities based on traffic demands placed on said remote MAC entities;

setting a backoff period with said local MAC entity if said MAC relay entity instructs said local MAC entity to assert flow control, wherein during said backoff period said local MAC entity may either declare a collision for all packets or alternatively declare a collision for specific packets having specific destination addresses at which traffic is congested; and resetting said backoff period to zero when said MAC relay entity indicates that it is no longer necessary to exert flow control before said backoff period has expired.

10. The method of claim 9, further comprising the steps of:

sending a non-exert flow control signal to said local MAC entity with said MAC relay entity; and transmitting a dummy packet with said local MAC entity to clear out said backoff and reset said remote MAC entities in response to said non-exert flow control signal.

11. The method of claim 9, further comprising the step of:

instructing said local MAC entity with said MAC relay entity that a certain destination is having a flow problem;

allowing traffic to flow through to some destinations but not to others.

12. An apparatus for providing improved flow control on a CSMA/CD network including at least one switch having a MAC relay entity and a plurality of remote MAC entities, said apparatus comprising:

a MAC relay entity for monitoring traffic from all of said remote MAC entities at a switch or bridge, said MAC relay entity notifying a local MAC relay entity that one or more of said remote MAC entities have excess traffic;

means for instructing said local MAC entity to exert or not exert flow control based on traffic demands placed on said remote MAC entities;

means for setting a backoff period if said MAC relay entity instructs said local MAC entity to exert flow control, wherein during said backoff period said local MAC entity may either declare a collision for all packets or alternatively declare a collision for specific packets having specific destination addresses at which traffic is congested; and means for resetting said backoff period to zero when said MAC relay entity indicates that it is no longer necessary to exert flow control before said backoff period has expired.

13. The apparatus of claim 12, further comprising:

means for sending a non-exert flow control signal to said local MAC entity with said MAC relay entity; and means for transmitting a dummy packet with said local MAC entity to clear out said backoff and reset said remote MAC entities in response to said non-exert flow control signal.

14. The apparatus of claim 12, further comprising:

means for instructing said local MAC entity with said MAC relay entity that a certain destination is having a flow problem;

means for allowing traffic to flow through to some destinations but not to others.

* * * * *